United States Patent
Ellis et al.

(10) Patent No.: US 8,729,425 B2
(45) Date of Patent: May 20, 2014

(54) AIR ASSIST APPARATUS AND METHOD FOR AN ENGRAVING LASER

(75) Inventors: John Ellis, Lafayette, CO (US); Chad A Mitchiner, Golden, CO (US)

(73) Assignee: Epilog Corporation, Golden, CO (US)

( * ) Notice: Subject to any disclaimer, the term of this patent is extended or adjusted under 35 U.S.C. 154(b) by 1024 days.

(21) Appl. No.: 12/391,407

(22) Filed: Feb. 24, 2009

(65) Prior Publication Data
US 2009/0212029 A1    Aug. 27, 2009

Related U.S. Application Data

(60) Provisional application No. 61/031,298, filed on Feb. 25, 2008.

(51) Int. Cl.
| | |
|---|---|
| *B23K 26/00* | (2014.01) |
| *B23K 26/36* | (2014.01) |
| *B23K 26/08* | (2014.01) |
| *B23K 26/12* | (2014.01) |

(52) U.S. Cl.
CPC ........... *B23K 26/365* (2013.01); *B23K 26/0853* (2013.01); *B23K 26/123* (2013.01)
USPC ................................. 219/121.68; 219/121.78

(58) Field of Classification Search
USPC ............. 219/121.68, 121.67, 121.69, 121.62, 219/121.55, 121.49, 121.79, 121.78, 219/121.83, 121.74, 121.82
See application file for complete search history.

(56) References Cited

U.S. PATENT DOCUMENTS

| | | | | |
|---|---|---|---|---|
| 6,609,540 | B1 * | 8/2003 | Torisu et al. | 137/896 |
| 7,126,082 | B2 * | 10/2006 | Lundberg | 219/121.62 |
| 7,704,047 | B2 * | 4/2010 | Liang et al. | 416/97 R |

* cited by examiner

*Primary Examiner* — Tu B Hoang
*Assistant Examiner* — Thien S Tran
(74) *Attorney, Agent, or Firm* — Swanson & Bratschun, L.L.C.

(57) ABSTRACT

An engraving laser assembly comprises a tubular rail defining a plenum in an interior of the rail. A carriage is operatively associated with to the tubular rail for axial movement along the rail. A focusing optic is mounted to the carriage for focusing a laser beam to a focal point on an engraving plane operatively with the carriage. A gas inlet is operatively associated with the tubular rail and the inlet is configured for attachment to a source of pressurized gas to provide pressurized gas to the plenum. A plurality of holes are provided in the tubular rail in fluid communication with the plenum. The holes are configured so that, with a source of pressurized gas attached to the gas inlet, a stream of pressurized gas is directed from each hole toward the engraving plane.

6 Claims, 6 Drawing Sheets

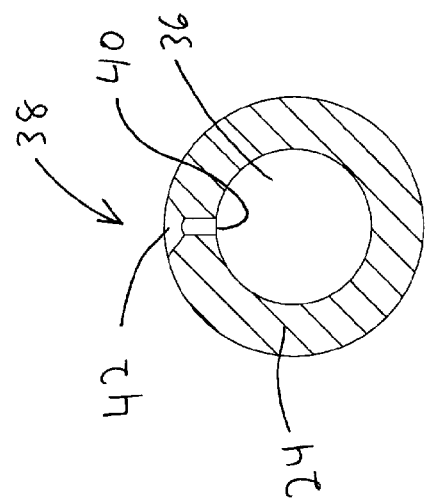
FIG. 5
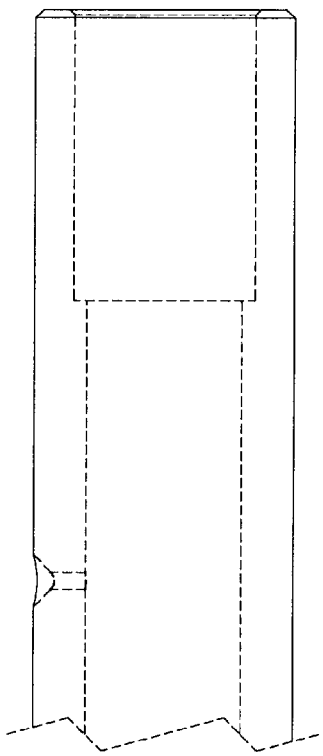
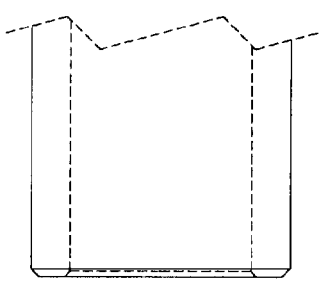

AIR ASSIST APPARATUS AND METHOD FOR AN ENGRAVING LASER

TECHNICAL FIELD

The present invention is directed toward engraving lasers and more particularly to an apparatus and method for providing an air stream to a laser focal point.

BACKGROUND

Engraving laser assemblies typically consist of a housing defining an engraving chamber for receiving a work piece. The engraving chamber generally comprises a lower surface which may support a work piece at the level of an engraving plane and a carriage operatively associated with one or more rails for axial movement along the rails, commonly referred to as movement along an X axis. The rails are typically movable as an assembly along a perpendicular Y axis. In this manner X and Y control motors can be actuated to move the carriage into operative association with the entire engraving plane.

The carriage is configured to direct a laser beam onto an object either resting on the lower surface or suspended in some manner within the engraving chamber under the carriage. As used herein "engraving plane" is intended to mean a plane onto which the laser is focused. For example, with a thin, flat work piece the "engraving plane" may essentially be the lower surface of the lasing chamber. For thicker work pieces the engraving plane may lie above the lower surface and correspond to a top surface of the work piece. As the carriage directs the laser beam onto a work piece received in the chamber, the beam selectively engraves the work piece. It is known to provide a concentrated stream of gas, typically air, from a nozzle attached to the carriage for the purpose of removing debris from the vicinity of the focused laser beam as the beam engraves a work piece and further to extinguish any flame that may result from the engraving process. Most typically this nozzle is connected to a coiled air supply tube extending from a sidewall of the engraving chamber to the nozzle. As the carriage is moved in an X direction along the rail and in a Y direction with the rail assembly, the nozzle moves with the carriage providing a stream of air to the focal point of the laser as the focal point moves during an engraving process. While such a configuration has the benefit of providing a focused stream of air at the focal point of the laser to clear debris and extinguish localized flames, if the carriage moves rapidly in the X direction it is possible that a flame ignited on the work piece will not be extinguished by the flow of air. In addition, with time the coiled supply tube has been known to fatigue and fail, creating maintenance issues. Further, the presence of the nozzle and the coiled supply tube associated therewith on the carriage increases the mass of the carriage requiring more robust motors and fittings to accommodate an increased dynamic load. This greater load also provides greater stress to components and may lead to less accurate positioning and component wear with extended usage of the engraving laser.

An alternative structure for providing air assist known in the art is providing a tube extending between rails of the rail assembly with axially spaced holes configured to direct a flow of air toward the engraving plane to remove work piece debris and extinguish flames. Such a structure has the advantage of minimizing mass of the X axis carriage, but adds additional mass to the rail assembly, providing an additional load on the Y control motor. Such a structure also simplifies air handling by eliminating the coiled tube and the nozzle on the carriage. In an effort to minimize weight on the rail assembly, these systems provide a thin walled tube for air delivery. However, such a tube is at risk for bending if inadvertently contacted.

The present invention is directed toward overcoming one or more of the problems discussed above.

SUMMARY OF THE EMBODIMENTS

A first aspect of the present invention is a engraving laser assembly comprising a tubular rail defining a plenum in an interior of the rail. A carriage is operatively associated with to the tubular rail for axial movement along the rail. A focusing optic is mounted to the carriage for focusing a laser beam to a focal point on an engraving plane operatively with the carriage. A gas inlet is operatively associated with the tubular rail and the inlet is configured for attachment to a source of pressurized gas to provide pressurized gas to the plenum. A plurality of holes are provided in the tubular rail in fluid communication with the plenum. The holes are configured so that, with a source of pressurized gas attached to the gas inlet, a stream of pressurized gas is directed from each hole toward the engraving plane. In one embodiment the engraving laser further comprises a plurality of holes configured to direct a stream of pressurized gas toward a line on the focal plane defined by movement of the focal point along the focal plane as the carriage moves axially of the tubular rail. At least one hole has a first diameter at the plenum and a second diameter on an outside of the tubular wall, the second diameter being greater than the first diameter. The hole may be chamfered. In another embodiment a second rail is provided parallel to the tubular rail with the carriage being mounted to both the tubular rail and second rail for axial movement along the rails. The gas inlet may be provided at one end of the tubular rail with the other end of the tubular rail being closed. The holes may be spaced axially along the tubular rail to provide a stream of gas in communication with an entire length of the line defined by movement of the focal point.

Another aspect is a method of providing a gas stream to a focal plane of an engraving laser. The method comprises providing a tubular rail defining a plenum in an interior of the rail and operatively associating a carriage with the tubular rail for axial movement along the tubular rail. Further provided is an engraving plane in operative association with the carriage. Pressurized air is provided in communication with the plenum and a plurality of holes are provided in the tubular rail spread axially along the tubular rail, with each of the plurality of holes being configured to direct a stream of pressurized gas from the plenum toward the focal plane.

The laser assembly disclosed and claimed herein provides for air assist to remove debris and extinguish any flames on a work piece caused by the laser engraving process. Incorporating delivery of the air assist into one of the rails supporting the X carriage minimizes the weight of the carriage and diminishes dynamic loads on the supporting mechanisms. The linear nature of the air assist provides a stream of air along the length of X movement of the X carriage which can extinguish any flames after passage of the carriage beyond an ignition point. The structure further has the advantage of locating the streams of air in close proximity to the laser focal point, allowing for greater intensity of airflow at this critical location. Further, the structure facilitates simplified air handling. Moreover, the thicker wall of the tubular rail allows for tailoring the shape of the air delivery holes to optimize air delivery.

BRIEF DESCRIPTION OF THE DRAWINGS

FIG. 5 is a cross-section of the tubular gas rail as depicted in FIG. 4; and

DETAILED DESCRIPTION

Figure 1:
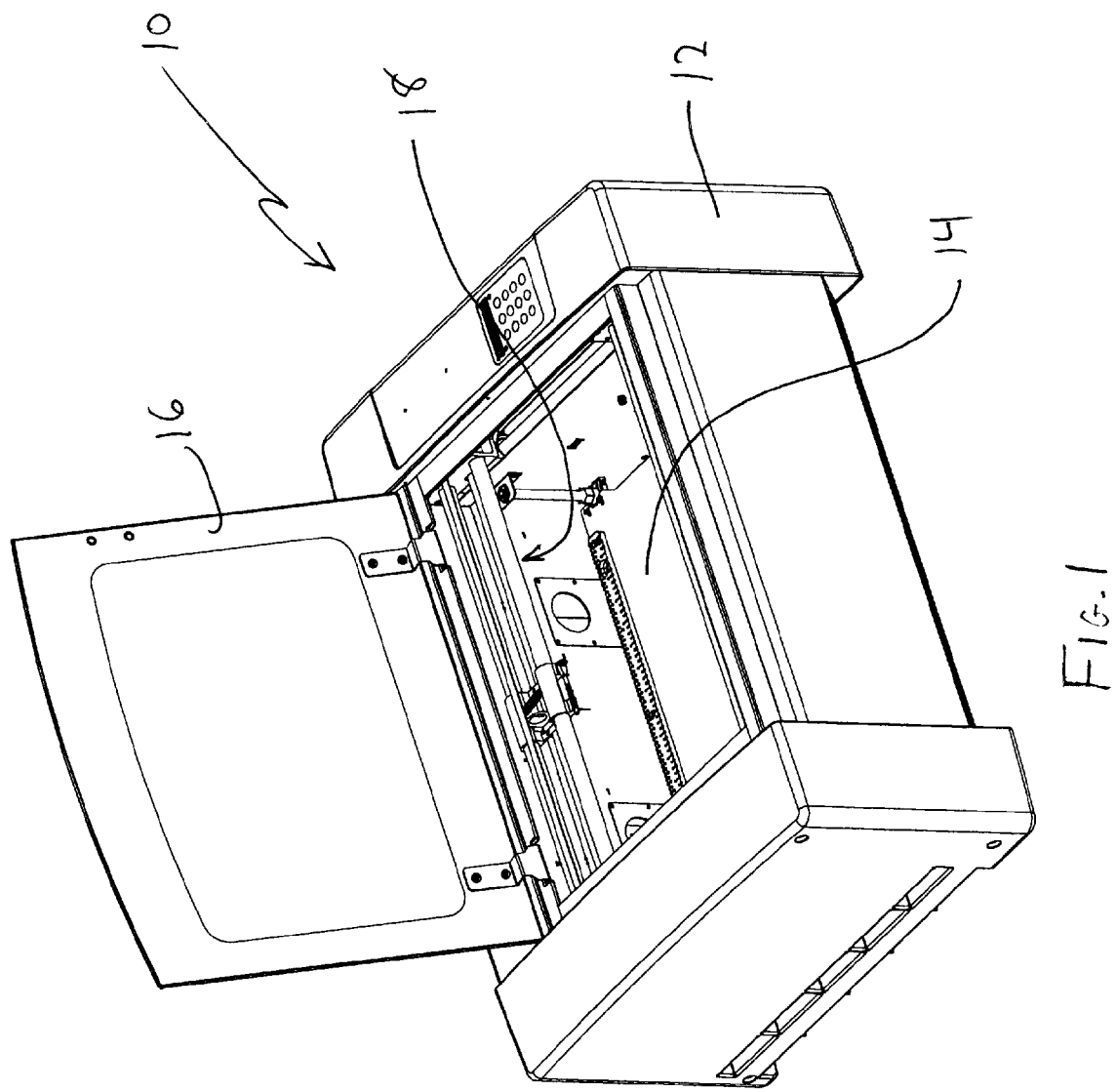
FIG. 1 is a perspective view of an engraving laser apparatus including an air assist apparatus and method in accordance with the present invention.
Figure 2:
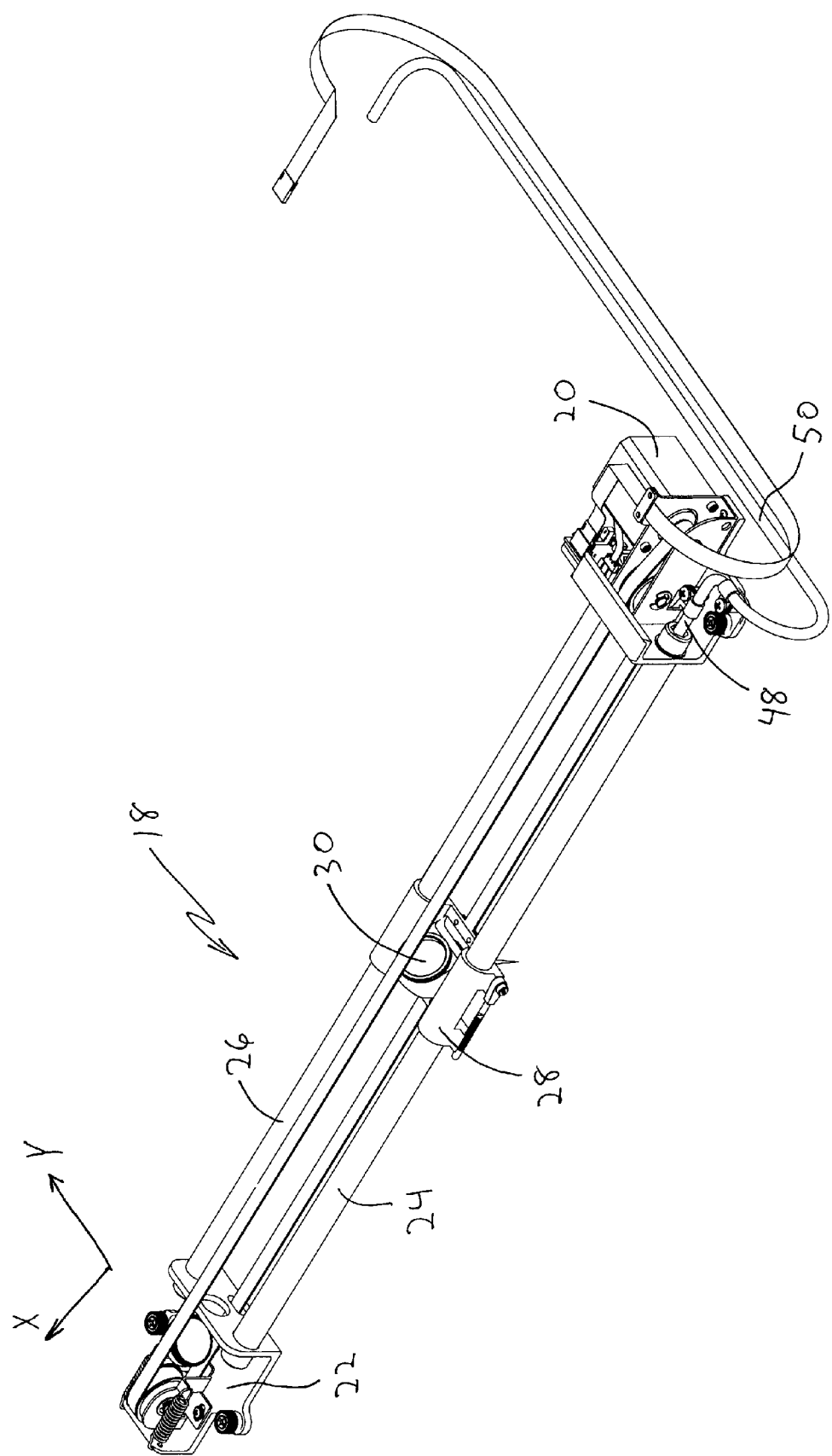
FIG. 2 is a perspective view of a rail assembly supporting a carriage in accordance with the present invention.
Figure 3:
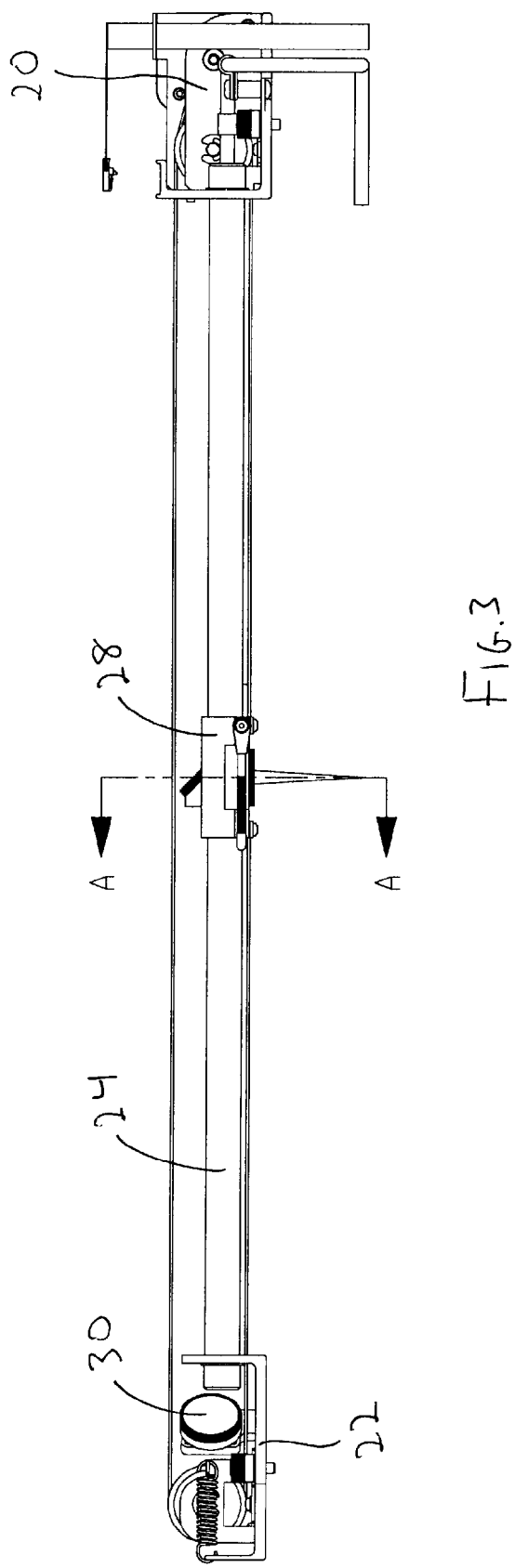
FIG. 3 is a front elevation view of the rail assembly supporting a carriage of FIG. 2.

An engraving laser apparatus 10 is shown in a perspective view in FIG. 1. The engraving laser apparatus 10 comprises a housing 12 defining an engraving chamber 14 accessed by a hinged lid 16. Operatively associated with the engraving chamber 14 and mounted near the top of the engraving chamber 14 is an XY laser directing apparatus 18. The XY laser directing apparatus 18 is depicted removed from the housing in FIG. 2. The XY laser directing apparatus 18 consists of a rail assembly, which comprises a pair of Y carriages 20, 22 with a pair of rails 24, 26 extending therebetween. An X axis carriage 28 rides on the rails 24, 26 for axial movement along an X axis along the rails 24, 26. The X axis carriage carries a carriage mirror 30 optically coupled to a focusing lens 32. The carriage mirror 30 and the focusing lens 32 are configured to receive and focus a laser beam to a focal point 34 as depicted in FIG. 4.

The rail 24 is a tubular gas supply rail and has an interior defining a plenum 36. As depicted herein the tubular gas supply rail 24 has a round cross-section, but other cross-section shapes may be suitable as well. Spaced axially of the tubular gas supply rail 24 are a plurality of holes 38 in fluid communication with the plenum 36. Referring to FIG. 5, the holes 38 have a round cross-section with a first diameter 40 at the plenum and a second diameter 42 at an outer surface of the tube wall, with the second diameter being greater than the first diameter. In this manner pressurized gas leaving the tube 40 is dispersed more than it would be with a single diameter hole. The holes 38 may also have cross-sections of other shapes as desired, for example oval or rectangular.

Figure 4:
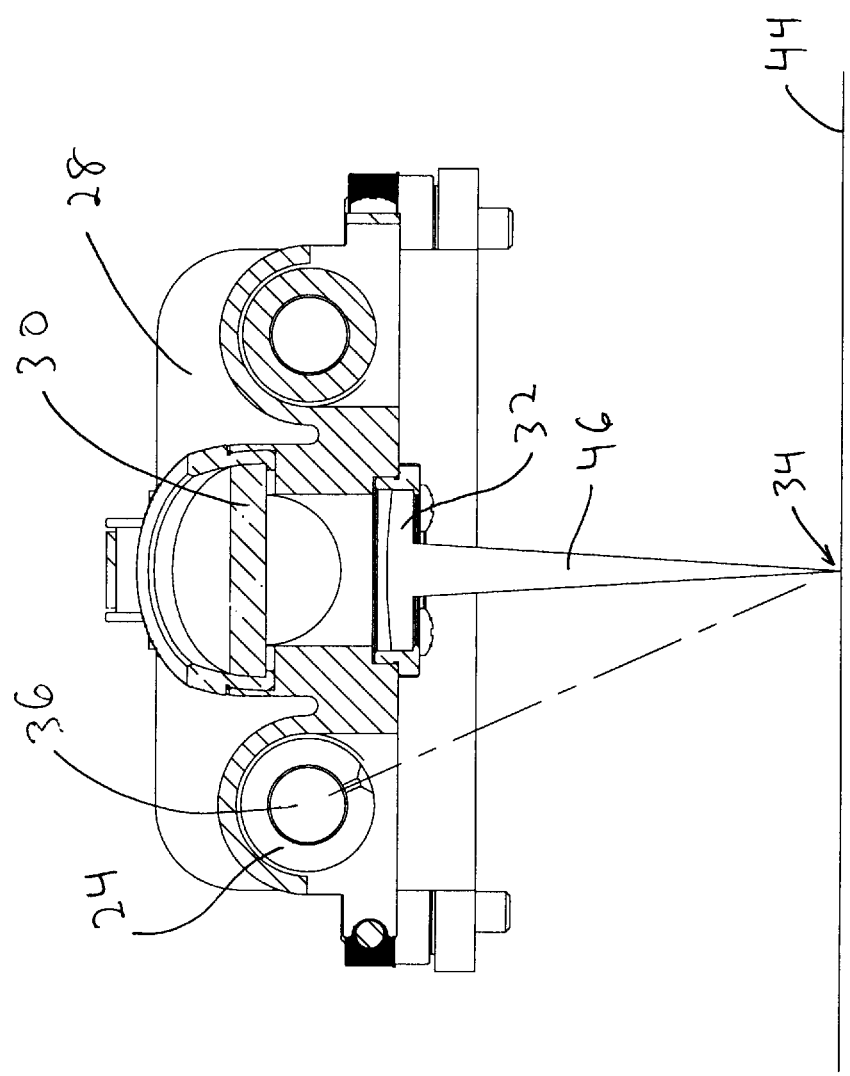
FIG. 4 is a cross-section of the carriage and a rail assembly taken along line A-A of FIG. 3.

Referring to FIG. 4, the holes 38 are configured so that, with a source of pressurized gas attached to a gas inlet, a stream of pressurized gas is directed from each hole toward an engraving plane 44 containing the focal point 34. The gas may be, by way of example, air or any other gas such as an inert gas like nitrogen. Air is typically used as the pressurized gas. More particularly, the holes 38 are configured to direct a stream of gas at an engraving plane defined by the point of the laser beam cone 46. The plurality of holes 38 effectively direct a stream of pressurized gas toward a line on the focal plane defined by movement of the focal point along the focal plane as the carriage 28 moves axially of the tubular gas supply rail 24 and the rail 26. Referring to FIG. 5, the holes 38 are preferably chamfered between first diameter portion 40 and the second diameter portion 42.

Referring back to FIG. 2, a gas inlet 48 is provided at one end of the tubular gas supply rail 24 and the other end of the tubular rail is closed. The gas inlet is configured for attachment to a gas supply line 50 which in turn is in fluid communication with a source of pressurized gas.

Figure 6:
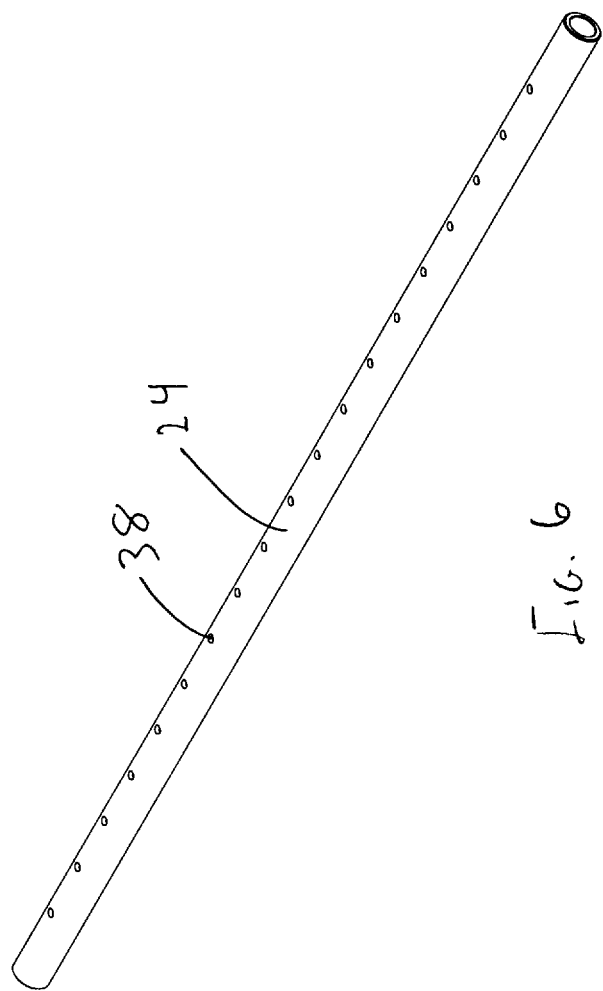
FIG. 6 is a perspective view of the tubular gas rail of FIG. 5

Referring to FIG. 6, the holes 38 are spaced axially along the length of the tubular gas supply rail 24 to provide a stream of air in communication with an entire length of a line defined by movement of the focal point along a focal plane. For example, the holes may be spaced about 1.2 inches apart and the chamfered holes provide a gas cone overlapping the supply of gas between adjacent holes at the focal plane to ensure along the length of the line defined by the focal point gas is provided. The hole for example may have a first diameter of about 0.040 inch and a second diameter of about 0.100 inch. In one example, supplying air at a pressure of 30 pounds/square inch at 2 cubic feet/minute flow has been found to provide an adequate supply of air for an effective air assist. Of course, higher pressure air at lower flow rates or lower pressure air at higher flow rates may be adequate as well.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims. All references cited herein are incorporated in their entirety by reference.

What is claimed is:

1. An XY laser for an engraving laser assembly, the XY laser directing apparatus comprising: a pair of spaced Y carriages each configured for movement along a Y axis; a tubular rail defining a plenum in an interior of the rail, the tubular rail extending along a X axis normal to the Y axis between the two Y carriages; an X axis carriage attached to the tubular rail for axial movement along the rail; a focusing optic mounted to the carriage for focusing a laser beam to a focal point on an engraving plane, wherein the focusing optic is mounted external to the plenum and wherein as the X axis carriage moves axially of the rail a line is defined on the engraving plane by the movement of the focal point along the X axis; a gas inlet operatively associated with the tubular rail configured for attachment to a source of pressurized gas to provide pressurized gas to the plenum; and a plurality of holes in the tubular rail in fluid communication with the plenum spaced lengthwise along the X axis, the holes being configured so that, with a source of pressurized gas attached to the gas inlet, the plurality of holes each direct a stream of pressurized gas toward the line defined on the engraving plane.

2. The engraving laser of claim 1 wherein at least one hole has a first diameter at the plenum and a second diameter on an outside wall of the tubular rail, the second diameter being greater than the first diameter.

3. The engraving laser of claim 2 wherein the hole is chamfered.

4. The engraving laser of claim 1 further comprising a second rail parallel to the tubular rail, the carriage being operatively associated with both the tubular rail and second rail for axial movement along the rails.

5. The engraving laser of claim 1 further comprising the gas inlet being at one end of the tubular rail and the other end of the tubular rail being closed.

6. The engraving laser of claim 1 wherein the holes are spaced axially along the tubular rail to provide a stream of gas in communication with an entire length of the line defined by movement of the focal point.

* * * * *